(12) United States Patent
Keller

(10) Patent No.: US 6,779,834 B1
(45) Date of Patent: Aug. 24, 2004

(54) DRAG REDUCTION CHANNEL APPARATUS FOR ROADWAY VEHICLES

(76) Inventor: Russell D. Keller, 3200 SW. 157th St., Oklahoma City, OK (US) 73170

( * ) Notice: Subject to any disclaimer, the term of this patent is extended or adjusted under 35 U.S.C. 154(b) by 0 days.

(21) Appl. No.: 10/659,573

(22) Filed: Sep. 10, 2003

(51) Int. Cl.$^7$ .............................................. B62D 35/00
(52) U.S. Cl. ..................................... 296/180.4; 296/208
(58) Field of Search ........................... 296/180.2, 180.4, 296/181.5, 208

(56) References Cited

U.S. PATENT DOCUMENTS

| | | | |
|---|---|---|---|
| 4,320,920 A | | 3/1982 | Goudey |
| 5,171,057 A | | 12/1992 | Sharp |
| 5,280,990 A | * | 1/1994 | Rinard ..................... 296/180.4 |
| 6,561,575 B2 | | 5/2003 | Fairburn |
| 6,595,578 B1 | | 7/2003 | Calsoyds et al. |
| 6,685,256 B1 | * | 2/2004 | Shermer ................... 296/180.4 |
| 6,692,066 B2 | * | 2/2004 | Fairburn et al. ............ 296/208 |

* cited by examiner

Primary Examiner—D. Glenn Dayoan
Assistant Examiner—Jason Morrow
(74) Attorney, Agent, or Firm—Randal D. Homburg

(57) ABSTRACT

An air diversion device captures a flow of air from above a roadway vehicle, more specifically large tractor trailer rigs operating over the highway, and forcibly diverts the captured air to the heart of the low pressure air void created behind the roadway vehicle as it passes over a roadway, reducing the amount of drag force applied to the roadway vehicle, thus increasing and enhancing the efficiency of operation of the roadway vehicle. The diversion device includes at least one air intake manifold placed on the top of the roadway vehicle near the rear of the roadway vehicle, a channeled duct system, and a forced air outlet projecting the forced air gathered by the air intake manifold through the channeled duct system, ejecting the forced air in a relatively horizontal plane into the mid-center portion of the rear of the roadway vehicle at a highly accelerated rate.

11 Claims, 5 Drawing Sheets

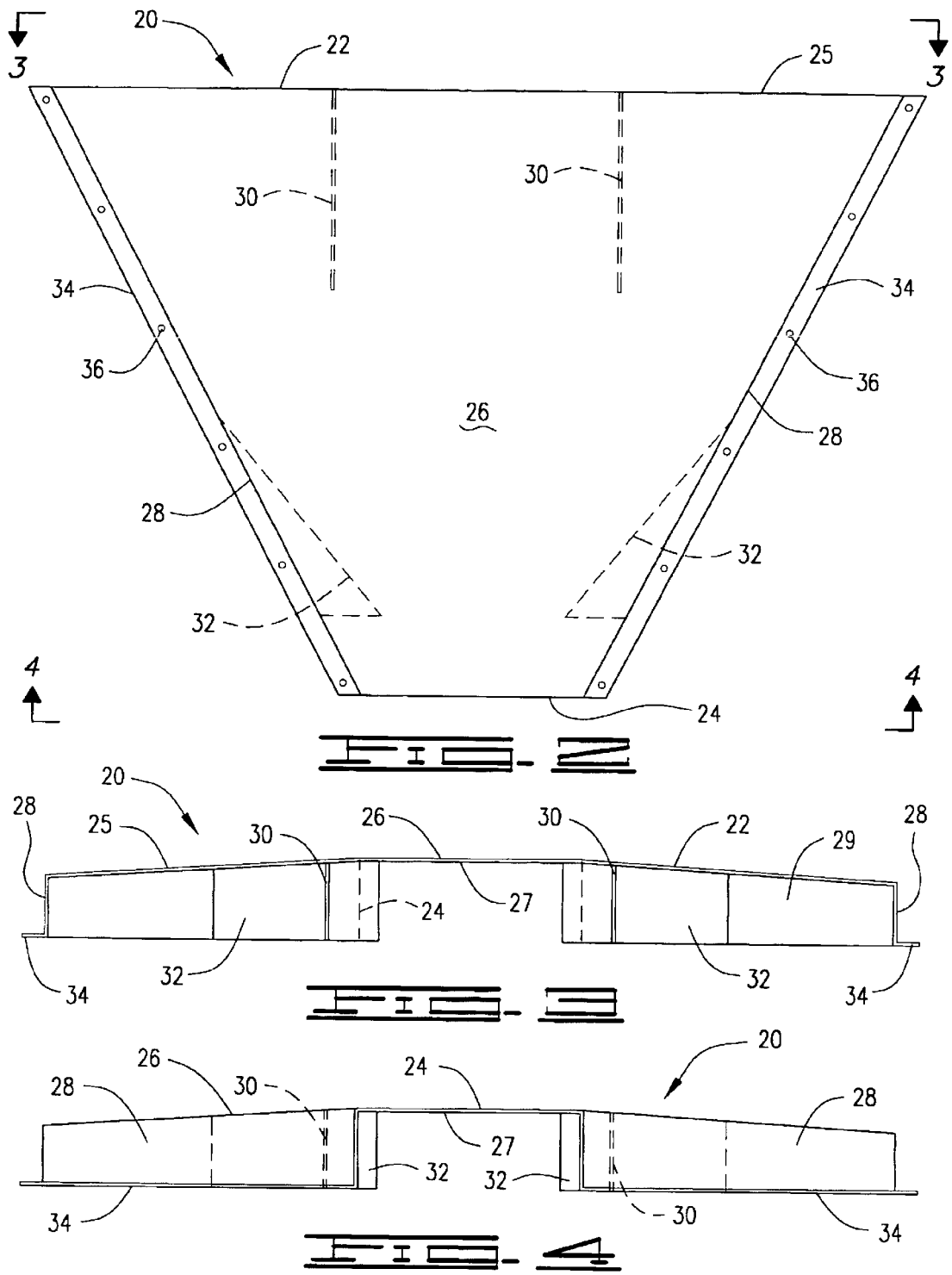

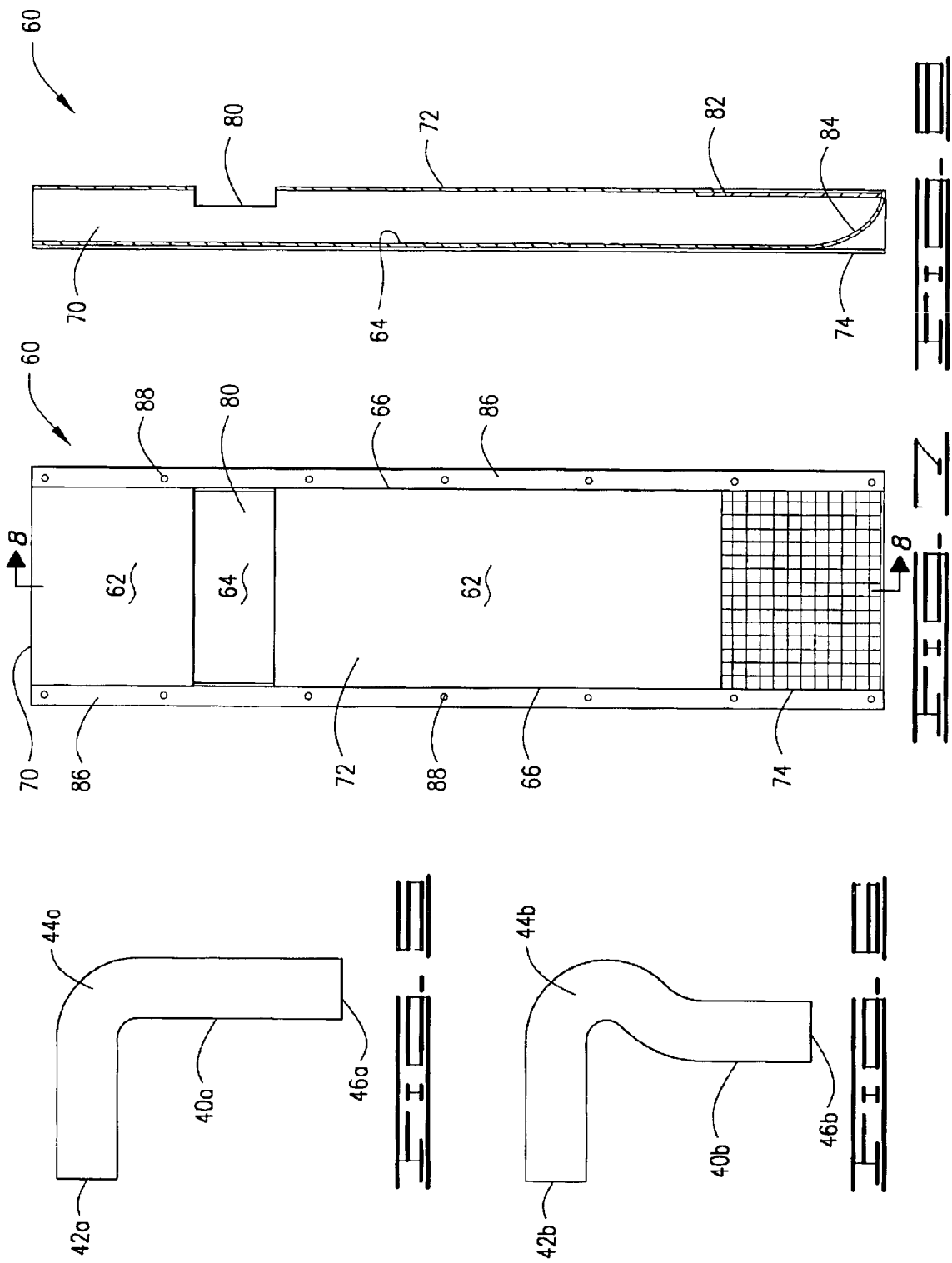

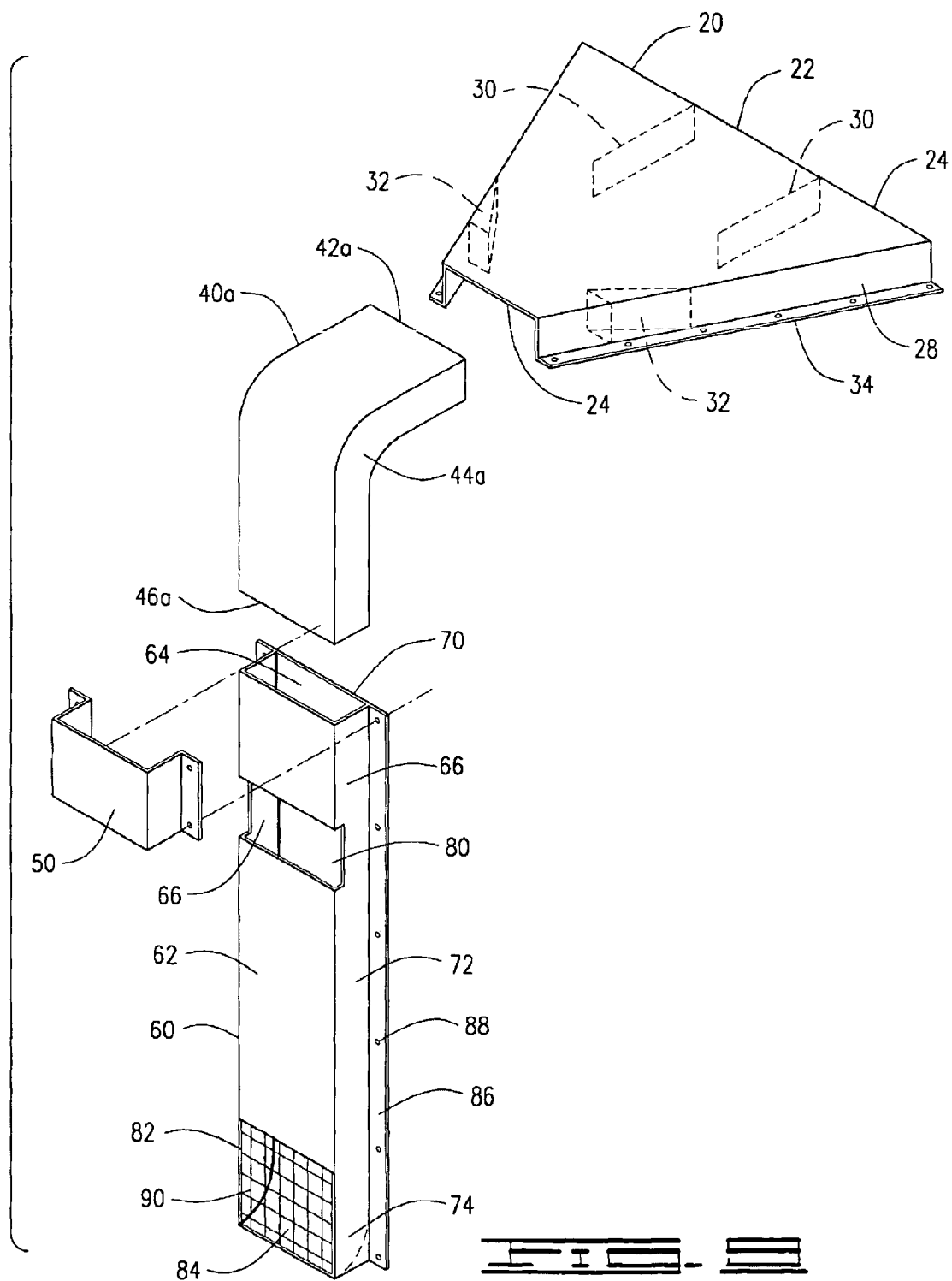

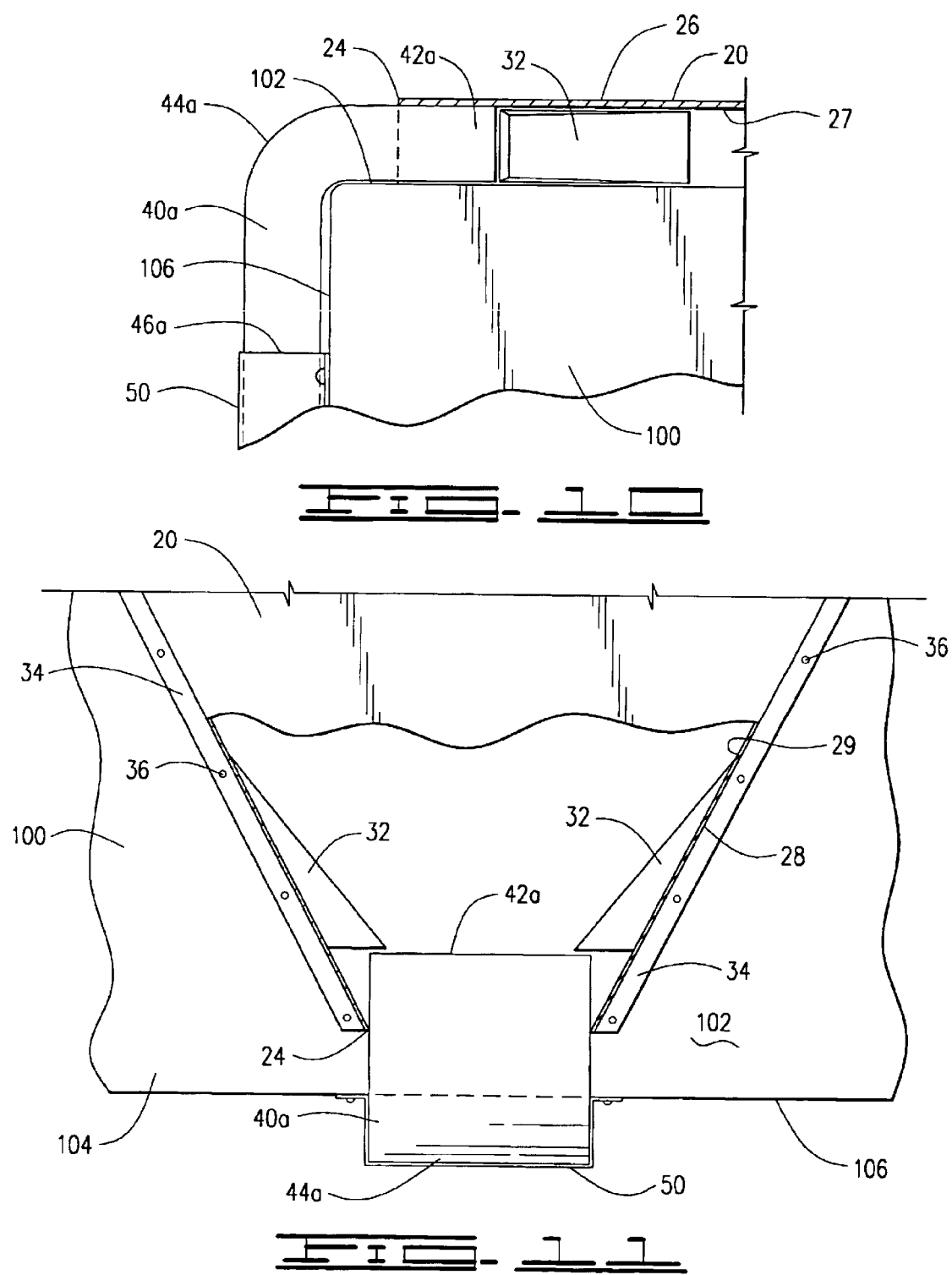

DRAG REDUCTION CHANNEL APPARATUS FOR ROADWAY VEHICLES

CROSS REFERENCE TO RELATED APPLICATIONS

None

BACKGROUND OF THE INVENTION

1. Field of Invention

An air diversion device captures a flow of air from above a roadway vehicle, more specifically large tractor trailer rigs operating over the highway, and forcibly diverts the captured air to the heart of the low pressure air void created behind the roadway vehicle as it passes over a roadway, reducing the amount of drag force applied to the roadway vehicle, thus increasing and enhancing the efficiency of operation of the roadway vehicle. The diversion device includes at least one air intake manifold placed on the top of the roadway vehicle near the rear of the roadway vehicle, a channeled duct system, and a forced air outlet projecting the forced air gathered by the air intake manifold through the channeled duct system, ejecting the forced air in a relatively horizontal plane into the mid-center portion of the rear of the roadway vehicle at a highly accelerated rate.

2. Description of Prior Art

The following United States patents were discovered and are disclosed within this application for utility patent. All relate to air channelers, truck air ducts and drag reduction mechanisms, all relative to truck efficiency.

In U.S. Pat. No. 5,171,057 to Sharp, an air channeler is disclosed wherein an entrance opening collects an amount of air from either a disclosed upper or side portion of a tractor trailer and channels the air into the center of the rear of the truck to provide the deflected air to the rear of the truck not only to minimize air drag and vacuum behind the truck, but to also keep the rear surface of the truck clean from debris and also to provide an amount of liquid cleaner to the rear surface through feed lines and a fluid pump mechanism. This device is provided as either attached to the swinging doors, FIG. 4, or pivotally mounting to the sides of the truck and moved out of the way for a sliding overhead door, FIGS. 7–10. The entrance opening and the exit openings appear to be and are disclosed as being the same size, and the exit opening does not eject the air outward from the rear of the truck, but to the rear center of the truck.

The duct apparatus of U.S. Pat. No. 4,320,920 to Goudey attaches to the corners of a semi-tractor trailer, van or bus and diverts air perpendicularly into the rear plane of the applied vehicle. U.S. Pat. No. 6,561,575 to Fairburn is an air channeler which derives intake air from the underside of a trailer and diverts the air through a cylindrical conduit to the rear of either the tractor or trailer or both. This duct has a damper located within the conduit. The air conduit is provided into two sections—a stationary section, terminating at its rearward end into a lip, just forward of the rearmost surface of a rear bumper of the trailer. A moveable portion has an upright portion and an elbow, with the elbow projecting forward a distance under the trailer, terminating in a lip. A rubber seal is applied to the lip of the elbow and the pressed against the lip of the rearward end of the stationary section, sealing the two section of the conduit. The air inlet is greater in diameter than the conduit and is located on the undercarriage of the semi-tractor trailer in front of the rear wheels to minimize the intake of more turbulent air.

The current channel apparatus, preferable provided in a pair of matched sets, scoops smooth air from the upper surface or roof of the roadway vehicle into an enlarged intake portion of an intake manifold which funnels the gathered air horizontally into a transfer end of the intake manifold. The funneled and accelerated compressed air is transferred into an flexible elbow which is removably inserted within the transfer end of the intake manifold, the elbow being made of a compressible and expandable material, the elbow further directing and diverting the air vertically to a downdraft duct attached to the rear surface of the roadway vehicle. The downdraft duct has a draft vent opening to promote the flow of air through the downdraft duct and to relieve stress upon on the downdraft duct, the downdraft duct having a ramped exhaust port with a removable dispersion screen, diverting the air from the downdraft duct directly outward from the rear surface of the roadway vehicle into the heart of a low pressure void behind the roadway vehicle, filling the void as quickly as possible with the ejected accelerated high velocity air. The ratio of the square dimension area of exhaust port of the downdraft duct to the intake portion of the intake manifold is at least 1:5, to promote the most rapid filling of the low pressure void as possible.

SUMMARY OF THE INVENTION

Drivers of roadway vehicle of a large size are hampered in the cost of travel and transport by a low pressure draft created behind their vehicles, as documented in the prior art cited above. For several years, attempts have been made to provide devices to either stem the flow of air around the vehicles, or to divert or channel air into the low pressure void. While several devices have provided air to the rear of the void, none of them have disclosed an apparatus that collected air, accelerated and compressed the air flow through a channel and ejected the accelerated and compressed air directly into the center or heart of the low pressure void created by the moving roadway vehicle, filling the low pressure void in a rapid manner as indicated by the current invention.

The primary objective of the invention is to provide a means of gathering smooth horizontal air from an upper surface of a roadway vehicle, compressing and accelerating the air through a substantial and mechanical tapered manifold and transferring the compressed and accelerated air vertically through a downdraft duct with a draft vent opening, and ejecting the compressed and accelerated air in a horizontal plane into a low pressure air void directly behind the roadway vehicle, converting the smooth upper air into forced linear air directed to the void to the fill the low pressure void in a rapid manner.

A second objective of the apparatus is to create the proper acceleration and compression of air by the apparatus by making the square area of the intake portion of the apparatus at least five times larger than the square area of the exhaust portion of the apparatus.

A third objective is to provide the device in a mode which will not interfere with access to the rear of the roadway vehicle to open and shut doors on the rear of the roadway vehicle.

A fourth objective of the device is to improve upon the prior art which did not provide for it means of accelerating and compressing air through their devices, did not provide an adequate mode to prevent and eliminate impedance to access to the rear of the vehicle to which they were mounted, and provide for the gathering of smooth air from the upper surface of the roadway vehicle as opposed to turbid air from the underside and sides of the vehicle, diverting this accelerated air directly outward into the center of the low pressure void at the rear of the vehicle.

DESCRIPTION OF THE DRAWINGS

The following drawings are submitted with this utility patent application.

FIG. 2 is a rear view of the intake manifold.

FIG. 3 is a front view of the intake manifold along lines 3/3 of FIG. 2.

FIG. 4 is a rear view of the intake manifold along lines 4/4 of FIG. 2.

FIG. 5 is a side view of a first embodiment of the elbow for a common box trailer.

FIG. 6 is a side view of a second embodiment of the elbow for a refrigerated tractor trailer.

FIG. 7 is a front view of the downdraft duct.

FIG. 8 is a side cross section view of the downdraft duct along Line 8/8 of FIG. 7.

FIG. 9 is an expanded drawing of the drag reduction channel apparatus.

FIG. 10 is a side cross-section of the intake manifold and the elbow in an engaged mode.

FIG. 11 is a top cross-section of the intake manifold and the elbow in an engaged mode.

DESCRIPTION OF THE PREFERRED EMBODIMENT

Figure 1:
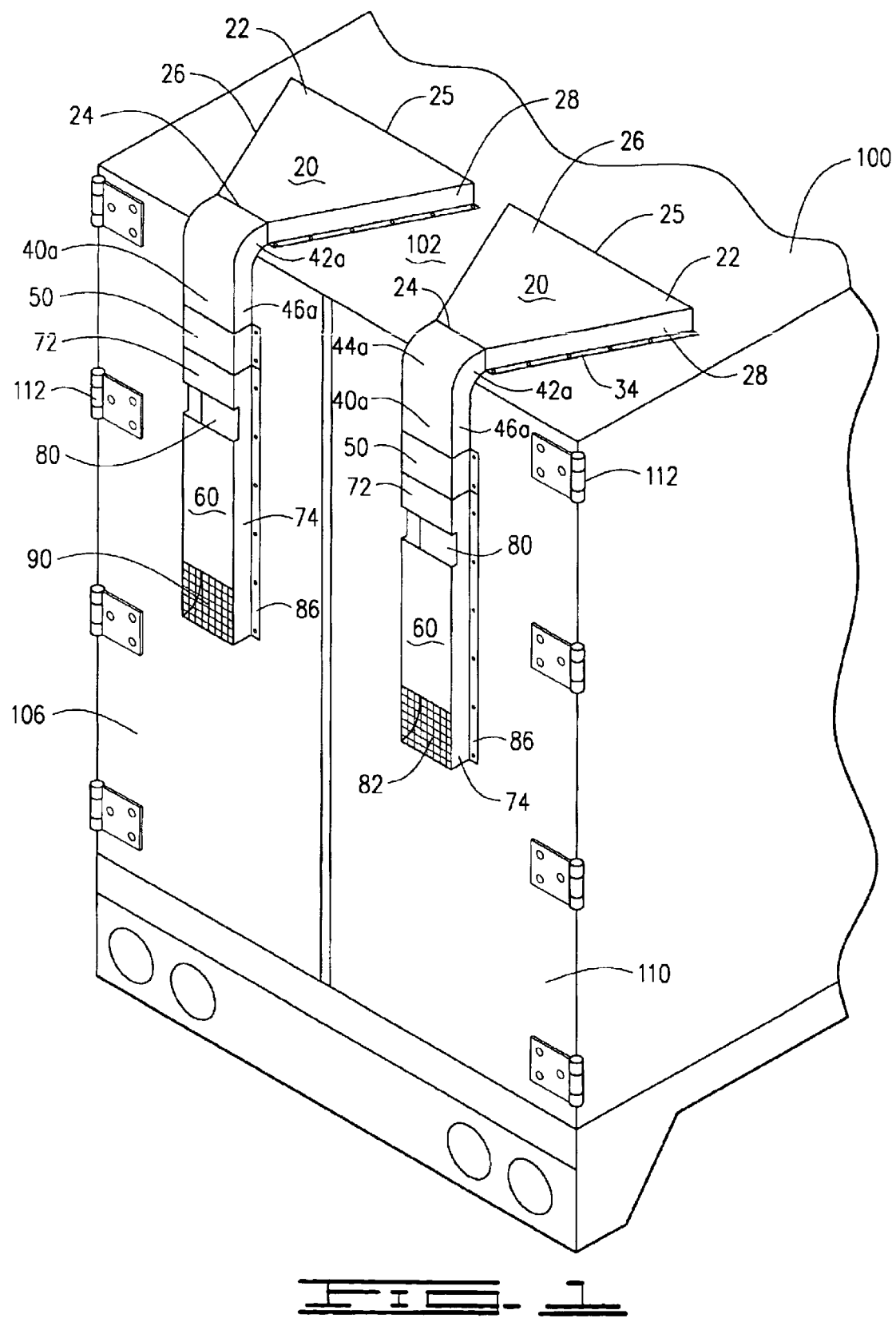
FIG. 1 is an upper perspective view of two pair of the drag reduction channel apparatuses attached to a roadway vehicle.

A drag reduction channeled apparatus, preferably supplied in two tandem sets, attaches to an upper surface 102 of a rear portion 104 of a roadway vehicle 100 to collect smooth air from above the roadway vehicle 100 which is further forcibly expelled into a low pressure void behind the roadway vehicle 100 during travel, shown in FIGS. 1–11 of the drawings, each drag reduction channeled apparatus comprising at least one tapered intake manifold 20 attached to the upper surface 102 of the rear portion 104 of the roadway vehicle 100, the intake manifold 20 having an enlarged intake portion 22 and a reduced transfer end 24, an elbow 40a, 40b having an intake end 42a, 42b adapted to fit within the reduced transfer end 24 of the intake manifold 20, a bent portion 44a, 44b and an output end 46a, 46b, a downdraft duct 60 having a receiving end 70 connecting to the output end 46a, 46b of the elbow 40a, 40b by a connector brace 50, a flow portion 72 including a draft vent opening 80 to provide flow enhancement to the downdraft duct 60, and a terminal end 74 having a ramped exhaust port 82 including an internal deflector ramp 84 to direct air flowing through the downdraft duct 60 outward in a horizontal plane, the terminal end 74 having a removable dispersion screen 90, the connector brace 50 and the downdraft duct 60 attaching to a rear panel 106 of the roadway vehicle 100.

The intake manifold 20, more specifically shown in FIGS. 2–4 of the drawings, is further defined as having the enlarged intake portion 22 being relatively rectangular and having a straight front edge 25 with at least two internal support fins 30 aligned perpendicular to the front edge 25 attaching to a lower surface 27 of an upper panel 26, at least two air deflection ramps 32 attaching to inner surfaces 29 of opposing tapered side panels 28, each air deflection ramp 32 further diverting air within the intake manifold 20 away from the side panels 28 prior to the air flowing within the intake manifold 20 reaching the transfer end 24 of the intake manifold 20. The transfer end 24 of the intake manifold 20 is also relatively rectangular but significantly smaller in size than the enlarged intake portion 22, the area of the transfer end 24 preferably at least five times smaller than the area of the enlarged intake portion 22 of the intake manifold 20, providing the intake manifold 20 with the desired taper, as shown in FIG. 2 of the drawings.

Extending outward from the side panels 28, indicated in FIGS. 1, 2, 4 and 11, are attaching flanges 34 having a plurality of holes 36 which accept either rivets, screws or bolts to attach the intake manifold 20 to the upper surface 102 of the rear portion 104 of the roadway vehicle 100. It is preferred that the intake manifold 20 be made entirely of a rigid sheet metal material to prevent potential deformity due to the intensive wind flow created by the roadway vehicle 100 traveling at highway speeds, with the internal support fins 30 maintaining the shape of the intake manifold 20 and preventing collapse of the intake manifold 20 during highway travel.

The elbow 40a, 40b is further defined in two embodiments, but commonly as a bent rectangular duct. A first embodiment of the elbow 40a, shown in FIGS. 1, 5 and 9–11 of the drawings, is adapted to a box trailer having panel doors 110 which open outward from side hinges 112. A second embodiment of the elbow, 40b, shown in FIG. 6 only of the drawings, is adapted to a refrigerated box trailer. Refrigerated box trailers have a roof which extends beyond the rear panel of a roadway vehicle 100, requiring the elbow 40b to be bent for a portion at an angle beyond ninety degrees, as indicated in FIG. 6, whereas a non-refrigerated box trailer has a rear panel 106 and roof forming an even common edge which would be best fitted by an elbow 40a having a straight ninety degree bend, as in FIG. 5. It is preferred that the elbow 40a, 40b be made of a flexible and expandable material in at least the bent portion 44a, 44b of the elbow 40 if not the entire elbow.

The intake end 42a, 42b of the elbow 40a, 40b is slightly smaller than the transfer end 24 of the intake manifold 20 and is adapted to fit within the reduced transfer end 24 of the intake manifold 20 with the intake end 42a, 42b of the elbow adapted to be inserted and removed from the transfer end 24 without deformity while still occupying as much of the transfer end 24 of the intake manifold 20 as possible, shown in FIGS. 10 and 11 of the drawings. The air deflection ramps 32 should terminate slightly in front of the intake end 42a, 42b of the elbow 40a, 40b, indicated in FIGS. 10 and 11, when the intake end 42a, 42b of the elbow is fully inserted within the transfer end 24 of the intake manifold 20, the air deflection ramps 32 channeling air into the intake end 42a, 42b of the elbow and minimizing air flow around the intake end 42a, 42b of the elbow 40a, 40b. For the remainder of this specification, the two embodiments will be discussed as one, with the elbow, intake end, bent portion and output end referenced generically as reference numbers 40, 42, 44 and 46 respectively, without an a or a b.

The output end 46 of the elbow 40 should be the same dimension, size and shape as the input end 42 of the elbow 40. The output end 46 of the elbow should also be the same size, shape and dimension as the receiving end 70 of the downdraft duct 60, wherein the output end 46 of the elbow 40 and the receiving end 70 of the downdraft duct 60 are mated when abutting each other. The connector brace 50 is placed over the abutted receiving end 70 of the downdraft duct 60 and the output end 46 of the elbow 40, FIGS. 1 and 9, forming a sealed connection between the elbow 40 and the downdraft duct 60, the connector brace 50 also anchoring the elbow 40 and the receiving end 70 of the downdraft duct 60 to the rear panel 104 of the roadway vehicle 100, which could be the rear panel 106 of a transport bus, a motor home, the panel doors 110 on the rear portion 106 of a semi-tractor trailer, a semi-tractor, or any vehicle traveling on a roadway.

The downdraft duct 60 is further defined and specifically shown in FIGS. 7–8 of the drawings, showing the downdraft duct 60 to also have a front panel 62, a rear panel 64 and two side panels 66. The receiving end 70 of the downdraft duct 60 is adapted to match and mate with the output end 46 of the elbow 40. The downdraft duct 60 is most preferably made of a rigid sheet metal, as is the intake manifold 20. The draft vent opening 80 is provided on the front panel 62 of the downdraft duct 60 to provide two functions. First, the draft vent opening 80 enhances air flow through the downdraft duct 60 by creating a suction force directed downward through the draft vent opening 80 by allowing secondary air introduction through the downdraft duct 60. Second, the draft vent opening 80 aids in the prevention of collapse of the downdraft duct 60 by providing a reduction of force to the front panel 62, rear panel 64 and two side panels 66, actually forcing them outward instead of inward onto each other. The downdraft duct 60 is further attached to the same surface as the connector brace 50 by attaching flanges 86 extending from the rear panel 64 and two side panels 66, the attaching flanges 86 also having a plurality of holes 88 which accept either rivets, screws or bolts to attach the downdraft duct 60 to the applied surface.

At the terminal end 74 of the downdraft duct 60, the ramped exhaust port 82 opens outward through the front panel 62. At the terminal end 74 is the internal deflector ramp 84, which is concaved and curved from the rear panel 64 to the front panel 62, attached to the two side panels 66, to divert the air flow outward in a horizontal plane, into the middle of the rear panel 106 of the roadway vehicle 100, which is the location of the greatest low pressure void behind the roadway vehicle 100. Covering the ramped exhaust port 82 is the removable dispersion screen 90, serving three purposes. First, the removable dispersion screen 90 is intended to spread the exhaust air to some extent. Second, it is intended that the removable dispersion screen 90 divert the air flow to an optimal location behind the roadway vehicle and stem the air flow to that optimal location, the diversion screen possibly containing adjustable louvers to accomplish this diversion. Third, the removable dispersion screen 90 prevents solid matter which might be sucked into the intake manifold 20 from being projected out of the ramped exhaust port 82 at a high velocity, which could pose hazard to a trailing vehicle. The removable dispersion screen 90 may be embodied as an upwardly sliding dispersion screen, not shown, which could be raised and lowered within the downdraft duct 60 within sliding channels mounted on an inner surface of the two side panels of the downdraft duct 60, also not shown, but contemplated within the scope of this invention.

In the event that the apparatus is applied to a semi-tractor trailer, which is the most suitable application of the apparatus as indicated in FIGS. 1 and 10–11 of the drawings, the elbow 40 and downdraft duct 60 remain attached to the panel doors 110, swinging away from the rear panel 106 of the trailer, but not so as to impede the opening and closing of the panel doors 110. The intake manifold 20 remains secured to the upper surface 102 of the rear portion 104 of the semi-tractor trailer when the panel doors 110 are open.

It is contemplated within the scope of this invention that the entire drag reduction channel apparatus may either be supplied as an after market product to attach to the roadway vehicle. However, it is also contemplated that the drag reduction channel apparatus may be installed as an embedded and incorporated factory apparatus which is provided with the intake manifold 20 provided as an upper extension of the roof of the roadway vehicle, with the elbow 40 and downdraft duct 60 formed within the body of the roadway vehicle, with the ramped exhaust port 82 and the removable dispersion screen 90 opening outward from the rear panel 106 of the roadway vehicle 100. This particular embodiment is not shown in the drawings.

While the invention has been particularly shown and described with reference to a preferred embodiment thereof, it will be understood by those skilled in the art that changes in form and detail may be made therein without departing from the spirit and scope of the invention.

What is claimed is:

1. A drag reduction channeled apparatus attached to an upper surface of a rear portion of a roadway vehicle to collect smooth air from above the roadway vehicle and forcibly channeled into a low pressure void behind said roadway vehicle during travel, each said drag reduction channeled apparatus comprising:

a tapered intake manifold attached to said upper surface of said rear portion of said roadway vehicle, said intake manifold having an enlarged intake portion and a reduced transfer end; an elbow having an intake end adapted to fit within the reduced transfer end of the intake manifold, a bent portion and an output end;

a downdraft duct having a receiving end connecting to the output end of the elbow, a flow portion including a draft vent opening to provide flow enhancement to the downdraft duct, and a terminal end having a ramped exhaust port including an internal deflector ramp to direct air flowing through the downdraft duct outward in a horizontal plane, the terminal end having a removable dispersion screen; and a connector brace connecting and covering the receiving end of the downdraft duct and the output end of the elbow, the connector brace and the downdraft duct attaching to a rear panel of the roadway vehicle.

2. The drag reduction channel apparatus, as disclosed in claim 1, wherein said drag reduction channel apparatus is supplied as a tandem pair, with said intake manifolds set side by side on said rear of said upper surface of said roadway vehicle, with said elbows and said downdraft ducts parallel in attachment to the rear panel of said roadway vehicle.

3. The drag reduction channel apparatus as disclosed in claim 1, said intake manifold further comprising:

said enlarged intake portion is rectangular including a straight front edge with at least two internal support fins aligned perpendicular to said front edge attaching to a lower surface of an upper panel, at least two air deflection ramps attaching to inner surfaces of opposing tapered side panels, each air deflection ramp further diverting air within said intake manifold away from said side panels prior to the air flowing within said intake manifold reaching said transfer end of said intake manifold;

said transfer end of said intake manifold is rectangular and substantially smaller in size than said enlarged intake portion, said transfer end being at least five times smaller than said enlarged intake portion of said intake manifold; and attaching flanges extending outward from said side panels, each said attaching flange having a plurality of holes through which said intake manifold is attached to said upper surface of said rear portion of said roadway vehicle.

4. The drag reduction channel apparatus as disclosed in claim 1, wherein:

said elbow is made of a flexible and expandable material in at least said bent portion of said elbow;

said intake end of said elbow is slightly smaller than said transfer end of said intake manifold, adapted to fit within said transfer end of said intake manifold with said intake end of said elbow adapted to be inserted and removed from said transfer end without deformity, said intake manifold having at least two deflection ramps terminating slightly in front of said intake end of said elbow when fully inserted within said transfer end of said intake manifold, said deflection ramps channeling air into said intake end of said elbow and minimizing air flow around said intake end of said elbow; and said output end of said elbow is the same dimension, size and shape as said input end of said elbow, and said output end of said elbow is also the same size, shape and dimension as said receiving end of said downdraft duct, wherein said output end of said elbow and said receiving end of said downdraft duct are mated when abutting each other.

5. The drag reduction channel apparatus as disclosed in claim 1, wherein:

said downdraft duct has a front panel, a rear panel and two side panels;

said receiving end of said downdraft duct adapted to match and mate with said output end of said elbow;

said downdraft duct having attaching flanges extending from said rear panel and two side panels attaching said downdraft duct to said rear panel through a plurality of holes in said attaching flanges; and said ramped exhaust port opening outward through said front panel, said internal deflector ramp, which is concaved and curved from said rear panel to said front panel, attaching to said two side panels, diverting the air flow outward in a horizontal plane from said rear panel of said roadway vehicle.

6. The drag reduction channel apparatus as disclosed in claim 1 wherein the elbow is a bent rectangular duct forming a ninety degree angle adapted to a box trailer having panel doors which open outward from side hinges.

7. The drag reduction channel apparatus as disclosed in claim 1 wherein the elbow is a bent rectangular duct adapted to a refrigerated box trailer having an upper surface extending beyond the rear panel of the roadway vehicle, requiring the elbow to be bent for a portion at an angle beyond ninety degrees.

8. A drag reduction channeled apparatus attached to an upper surface of a rear portion of a roadway vehicle to collect smooth air from above said roadway vehicle and forcibly channeled into a low pressure void behind said roadway vehicle during travel, each said drag reduction channeled apparatus comprising:

a tapered intake manifold attached to said upper surface of said rear portion of said roadway vehicle, said intake manifold having an enlarged intake portion and a reduced transfer end, said enlarged intake portion is rectangular including a straight front edge with at least two internal support fins aligned perpendicular to said front edge attaching to a lower surface of an upper panel, at least two air deflection ramps attaching to inner surfaces of opposing tapered side panels, each air deflection ramp further diverting air within said intake manifold away from said side panels prior to the air flowing within said intake manifold reaching said transfer end of said intake manifold, said transfer end of said intake manifold is rectangular and substantially smaller in size than said enlarged intake portion, said transfer end being at least five times smaller than said enlarged intake portion of said intake manifold, and attaching flanges extending outward from said side panels, each said attaching flange having a plurality of holes through which said intake manifold is attached to said upper surface of said rear portion of said roadway vehicle;

an elbow having an intake end adapted to fit within said reduced transfer end of said intake manifold, a bent portion and an output end, said elbow made from flexible and expandable material in at least said bent portion of said elbow, said intake end of said elbow is slightly smaller than said transfer end of said intake manifold, adapted to fit within said reduced transfer end of said intake manifold with said intake end of said elbow adapted to be inserted and removed from said transfer end without deformity, said deflection ramps of said intake manifold terminating slightly in front of said intake end of said elbow when fully inserted within said transfer end of said intake manifold, said deflection ramps channeling air into said intake end of said elbow and minimizing air flow around said intake end of said elbow, and said output end of said elbow is the same dimension, size and shape as said input end of said elbow, and said output end of said elbow is also the same size, shape and dimension as said receiving end of said downdraft duct, wherein said output end of said elbow and said receiving end of said downdraft duct are mated when abutting each other;

a downdraft duct having a front panel, a rear panel, two side panels, a receiving end connecting to said output end of said elbow, a flow portion including a draft vent opening, and a terminal end having a ramped exhaust port including an internal deflector ramp, a removable dispersion screen, and attaching flanges extending from said rear panel and two side panels attaching said downdraft duct to said rear panel through a plurality of holes in said attaching flanges, said receiving end of said downdraft duct adapted to match and mate with said output end of said elbow, said ramped exhaust port opening outward through said front panel, said internal deflector ramp concaved and curved from said rear panel to said front panel, attaching to said two side panels, diverting the air flow outward in a horizontal plane from said rear panel of said roadway vehicle; and a connector brace connecting and covering said receiving end of said downdraft duct and said output end of said elbow, said connector brace and said downdraft duct attaching to a rear panel of said roadway vehicle.

9. The drag reduction channel apparatus as disclosed in claim 8, wherein said drag reduction channel apparatus is supplied as a tandem pair, with said intake manifolds set side by side on said rear of said upper surface of said roadway vehicle, with said elbows and said downdraft ducts parallel in attachment to the rear panel of said roadway vehicle.

10. The drag reduction channel apparatus as disclosed in claim 8 wherein the elbow is a bent rectangular duct forming a ninety degree angle adapted to a box trailer having panel doors which open outward from side hinges.

11. The drag reduction channel apparatus as disclosed in claim 8 wherein the elbow is a bent rectangular duct adapted to a refrigerated box trailer having an upper surface extending beyond the rear panel of the roadway vehicle, requiring the elbow to be bent for a portion at an angle beyond ninety degrees.

* * * * *